(12) United States Patent
Ikeda et al.

(10) Patent No.: US 6,339,449 B1
(45) Date of Patent: Jan. 15, 2002

(54) METHOD AND DEVICE FOR SUPERIMPOSING ADDITIONAL INFORMATION ON A VIDEO SIGNAL

(75) Inventors: Nozomu Ikeda; Akira Ogino; Hisayoshi Moriwaki; Takashi Kohashi, all of Tokyo; Yuji Kimura, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/143,972

(22) Filed: Aug. 31, 1998

(30) Foreign Application Priority Data

Sep. 1, 1997 (JP) .......................... PO9-235787

(51) Int. Cl.[7] .................... H04N 11/20; H04N 7/00
(52) U.S. Cl. ................ 348/463; 348/467; 348/473; 386/94; 380/201; 380/203
(58) Field of Search .................. 348/584, 469, 348/465, 461, 463, 464, 467, 478, 473, 476; 386/94, 95; 380/201, 203, 268; 375/200–204, 206–210; H04N 11/20, 7/00

(56) References Cited

U.S. PATENT DOCUMENTS

| 6,023,551 A | * | 2/2000 | Sugita et al. .................. 386/94 |
| 5,953,417 A | * | 5/2000 | Ikeda et al. ..................... 380/5 |
| 6,058,243 A | * | 5/2000 | Ogino et al. .................. 386/94 |
| 6,069,665 A | * | 5/2000 | Ikeda et al. .................. 348/478 |
| 6,195,129 B1 | * | 2/2001 | Ogino et al. .................. 348/469 |
| 6,253,020 B1 | * | 6/2001 | Ogino et al. .................. 386/94 |
| 6,263,153 B1 | * | 7/2001 | Ogino et al. .................. 386/94 |

FOREIGN PATENT DOCUMENTS

| EP | 0360615 | 9/1989 | ........... H04N/7/08 |
| EP | 0778566 | 11/1996 | ........... G11B/20/00 |
| EP | 0838946 | 10/1997 | .......... H04N/5/913 |
| EP | 0843473 | 11/1997 | .......... H04N/5/913 |
| EP | 0848550 | 11/1997 | .......... H04N/5/913 |
| EP | 0848551 | 12/1997 | .......... H04N/5/913 |
| EP | 0849945 | 12/1997 | .......... H04N/5/913 |

* cited by examiner

Primary Examiner—Michael Lee
(74) Attorney, Agent, or Firm—Jay H. Maioli

(57) ABSTRACT

An additional information signal is superimposed on a video signal at a very low level so that it does not stand out on the reproduced image. Spectral spreading code sequences are generated corresponding to different predetermined parts of the video signal. Bit information signals of the additional information signal made up of plural bits are spectrally spread by the spreading codes to generate spectrally spread bit information signals corresponding to the plural bits. The spectrally spread bit information signals are superimposed on corresponding different predetermined parts of the video signal. Because high priority bit information signals of the spectrally spread additional information signal are superimposed on high priority parts of the video signal, high priority information in the additional information can be protected even if the video signal is modified.

12 Claims, 10 Drawing Sheets

ANTI-DUPLICATION CONTROL SIGNAL
SPECTRUM BEFORE SPECTRAL SPREADING

FIG. 7B

ANTI-DUPLICATION CONTROL SIGNAL
SPECTRUM AFTER SPECTRAL SPREADING

FIG. 7C

SPECTRUM OF INFORMATION SIGNAL ON WHICH SS ANTI-DUPLICATION CONTROL SIGNAL IS SUPERIMPOSED

FIG. 7D

SIGNAL SPECTRUM AFTER REVERSE SPECTRAL SPREADING ON RECORDER SIDE

■ INFORMATION BIT 1
□ INFORMATION BIT 2

FIG. 11

■ INFORMATION BIT 1
□ INFORMATION BIT 2

METHOD AND DEVICE FOR SUPERIMPOSING ADDITIONAL INFORMATION ON A VIDEO SIGNAL

FIELD OF THE INVENTION

This invention relates to a method and device for superimposing additional information on a video signal at a very low level which has as little effect as possible in a reproduced image.

BACKGROUND OF THE INVENTION

Devices for recording digital information, such as digital VTR and MD (mini-disc) record players, are in widespread use, and DVD (digital video disc or digital versatile disk) devices with recording functions have also appeared.

In these digital information recorders, various additional information signals can be recorded together with the main video and audio signals or computer data, etc. In this case, the additional information signal is a digital signal recorded on an area distinct from digital information signal areas, such as for example the headers added to every block of data or TOC (Table of Contents) area.

In the case of a system where additional information is transmitted by superimposing on a conventional main video signal, therefore, the additional information signal is not superimposed directly on digital information signals such as headers, but is recorded on an indirect area.

The additional information signal may therefore easily be eliminated by filtering or tampering, so that necessary additional information signals can no longer be detected by recording and playback devices.

In particular, when control information and copyright information are added as additional information signals to prevent illegal duplication, their original purpose cannot be achieved due to the elimination of the additional information signal.

Moreover, if the additional information signal is added to an indirect area, only the main information signal will be obtained when the digital information signal is converted to an analog signal and the additional information signal will be lost.

This means that even if an anti-duplication control signal is added as an additional information signal to prevent illegal duplication, this strategy is completely ineffective when the signal is converted to an analog signal.

To solve this problem of the disappearance of the additional information signal when the signal is converted to an analog signal, the inventors already proposed a method wherein an additional information signal such as an anti-duplication signal is spectrally spread, and the spectrally spread additional information signal is superimposed on a video signal during digital or analog recording (U.S. patent application Ser. No. 08/75510).

In this method, spectral spreading is performed by, for example, generating a code of a PN (Pseudorandom Noise) sequence (hereafter, referred to as a PN code) at a sufficiently high rate and applying it to the additional information signal. An additional information signal such as a narrow-band, high level anti-duplication control signal is thereby converted to a wideband, very low level signal which has no effect on the video signal.

The additional information signal which has been spectrally spread in this way, i.e. the spectrally spread signal, is then superimposed on an analog video signal and recorded on a recording medium.

The video signal recorded on the recording medium may be either analog or digital.

In this method, the additional information signal, such as an anti-duplication control signal, is superimposed with the same timing and frequency as the video signal. It is therefore difficult for a person who wishes to perform illegal duplication to remove the superimposed anti-duplication control signal from the video signal.

However, the additional information signal such as a superimposed anti-duplication control signal can still be detected and used by performing reverse spreading.

Regarding ease of detection when the additional information is superimposed on a video signal as a spectrally spread signal, additional information bits can be spectrally spread by a spreading code synchronized with a sync signal of the video signal so as to generate a spectrally spread signal, and this spectrally spread signal then superimposed on the video signal.

If the spreading code is generated in synchronism with the video signal, it is merely required to generate, in synchronism with the sync signal of the video signal, a spreading code for performing reverse spreading when the additional information is to be detected. As it is simple to generate a reverse spreading code synchronized with the spreading code when the signal is superimposed, detection can be performed easily.

For example, the additional information may be spectrally spread using a spreading code having a field period synchronized with the vertical sync signal of the video signal.

From the viewpoint of ease of detecting the additional information when it comprises plural bits and making use of the characteristics of spectral spreading techniques, the bit information in each of the plural bits can be spectrally spread by different sequences of spreading codes. For example, CGMS (Copy Generation Management System) is a well-known anti-duplication control signal. In CGMS, the anti-duplication control signal comprises two bits of information: 00 which permits unrestricted duplication, 10 which permits only first generation copies, and 11 which prohibits duplication.

When these two bits of information are superimposed in synchronism with a video signal by the above-mentioned spectral spreading technique, the upper bit of information is spectrally spread by a first spreading code sequence, and the lower bit of information is spectrally spread by a second spreading code sequence, and the spectrally spread signals of the two sequences are superimposed at the same time on the video signal.

In spectral spreading technology, the two bits of additional information superimposed as described hereabove can be detected by performing reverse spreading of the first and second spreading code sequences which are synchronized with the image sync signal.

However, when plural bits are spectrally spread by different spreading code sequences and are all superimposed on the video signal, although they are each superimposed at a very low level, they together result in a part with a high level. In this part, therefore, the superimposed additional information may have an effect on the reproduced image leading to a deterioration of the S/N of the reproduced image.

Therefore, it was proposed that the spectrally spread signal obtained by spreading plural bits using different spreading code sequences should not be superimposed on all the areas of one screen, but in an area which does not interfere with observation of the screen such as the left or right edge.

However, when the spectrally spread signal obtained from the bits of additional information is concentrated in a fixed part of the screen, if the vertical sync signal of the video signal is changed in an effort to disable the anti-duplication control signal and the sync timing is offset, it may occur that the additional information signal can not be detected.

In particular, in the case of CGMS, the lower bit is [1] and if this lower bit is not detected, it may no longer be possible to prevent duplication.

In the case of CGMS, even if the upper bit is [1], it is not possible to distinguish whether duplication is prohibited or permitted, but if the lower bit is [1], it means that duplication is prohibited.

In other words in the case of CGMS, the lower bit has high priority, and if this high priority information bit is missing, effective anti-duplication is impossible.

This invention, which was conceived in view of the aforesaid problems, therefore aims to provide a method and device for superimposing important bits of additional information on a video signal with as little effect on the video signal as possible, and such that the additional information is not lost even when an attempt is made to illegally modify the video signal.

SUMMARY OF THE INVENTION

In the method and device for superimposing an additional information signal on a video signal according to this invention, spreading code sequences are generated corresponding to different predetermined parts of a video signal in synchronism with a sync signal of the video signal, bit information signals of the additional information signal comprising plural bits are spectrally spread by the spreading code sequences to generate spectrally spread bit information signals corresponding to the plural bits, and the spectrally spread bit information signals are superimposed on corresponding different predetermined parts of the video signal.

According to this invention, relatively high priority bit information signals of the spectrally spread additional information signal are superimposed on high priority parts of the video signal, so high priority information in the additional information can be protected.

DESCRIPTION OF THE PREFERRED EMBODIMENTS

Some preferred forms of the method and device for superimposing additional information on a video signal according to this invention will now be described with reference to the attached drawings.

In the embodiment described hereafter, this invention is applied to a system where an analog output video signal from an image output device, such as from a DVD player, is supplied to a DVD recorder for the purpose of copying, and this copying is controlled.

In other words, in this example, the additional information to be superimposed is an anti-duplication control signal.

The anti-duplication control signal in the case of this embodiment is the aforesaid two bits of additional information. The additional two bits of information of CGMS is superimposed in every field by a spreading code which is synchronized with the vertical sync signal of the video signal, and the superimposing position is determined according to the respective priority of these two bits of information.

In the following description, the lower bit which has the higher priority of the two bits of additional information of CGMS is superimposed in a center position in the horizontal direction on the screen as shown by the grid points in FIG. 1, and the upper bit is superimposed on the left or right edges in a horizontal direction of the screen.

For example, if a person attempts to make an illegal copy and shifts the phase of the vertical sync signal of the video signal, as the video signal on the left edge or right edge of the screen is not regarded as an effective video signal area, the additional information superimposed on this part would effectively be removed, so detection would evidently be impossible.

However, if the additional information is in the center part of the screen, this kind of disadvantage will not occur even if the phase of the vertical sync signal is shifted.

In this system, in the DVD player, the anti-duplication control information which has been spectrally spread is superimposed on the analog output video signal, output and supplied to the DVD recorder.

In the DVD recorder, the spectrally spread anti-duplication control information superimposed on the analog output video signal from the DVD player is detected, and copy control is performed according to the detection output.

The method of superimposing additional information according to this invention is applied to the superimposition of the spectrally spread signal, which is an additional information signal, in the DVD player.

First the DVD player, which spectrally spreads and superimposes the anti-duplication control information, will be described.

The anti-duplication control signal which is two bits of additional information is not spread by a single spreading code, the upper bit and lower bit of the information being spectrally spread by different spreading code sequences.

In the following embodiment, the spectral spreading code is superimposed on the brightness signal Y of the video signals, but is not superimposed on the color signal C.

It may of course also be superimposed on the color signal C. However, the color signal of a video signal is transmitted by, for example, two phase axis components such as color difference signals and the color is reproduced by the phases of these two axes. Consequently, if the spectrally spread signal were superimposed on this color signal, there would be a change of hue even if the superimposed signal has a very low level so that the signal is relatively obvious. It is therefore difficult to superimpose the spectrally spread signal without affecting the hue.

According to this embodiment, the spectrally spread signal is superimposed only on the brightness signal, however to simplify the description, the term "video signal" will be used without making any distinction between the brightness signal Y and the color signal C.

Figure 2:
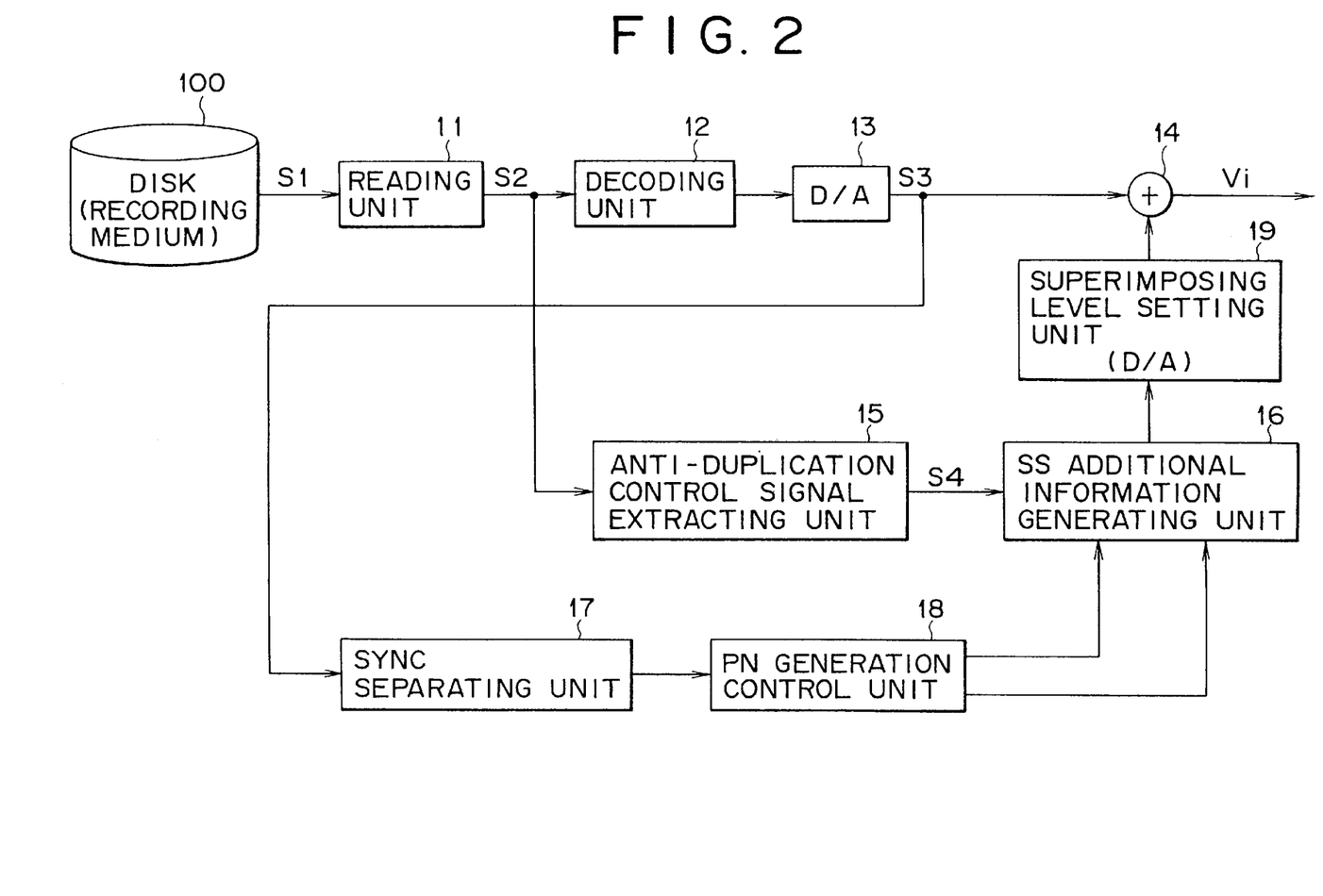
FIG. 2 is a diagram for describing an additional information superimposing pattern in the additional information superimposing method according to this invention.

In FIG. 2, a digitized video signal and audio signal are recorded together with an anti-duplication control signal of a CGMS on a disk 100, which in this example is a DVD. The anti-duplication control signal of the CGMS may be recorded in a track area referred to as a TOC (Table Of Contents) or directory on the innermost or outermost part of the disk 100, or on another recording area inserted in a track on which image data and audio data are recorded.

The following example describes the latter case, wherein the anti-duplication control signal is read simultaneously when the image data is read.

The player of this example comprises a reading unit 11, decoding unit 12, D/A conversion circuit 13, superimposing unit 14, anti-duplication control signal extracting unit 15, SS additional information generation unit 16 (SS is an abbreviation for spectral spreading, sync separating unit 17, PN generation control unit 18, and superimposition level setting unit 19 as shown in FIG. 2.

The reading unit 11 extracts a reproduced video signal component S2 from a signal S1 obtained by reproducing the information recorded on the disk 100, and supplies it to the decoding unit 12 and anti-duplication control signal extracting unit 15.

The decoding unit 12 performs decoding of the reproduced video signal component S2 to form a digital video signal which is supplied to the D/A conversion circuit 13.

The D/A conversion circuit 13 D/A converts the digital video signal to an analog video signal S3 which comprises a sync signal. This is supplied to the sync separating unit 17 and superimposing unit 14.

The anti-duplication control signal extracting unit 15 extracts the anti-duplication control signal S4 added to the reproduced video signal component S2, and supplies it to the SS additional information generation unit 16.

The sync separating unit 17 extracts a horizontal sync signal H and vertical sync signal V from the analog video signal S3, and supplies them to the PN generation control unit 18.

Using the horizontal sync signal H and vertical sync signal V as reference signals, the PN generation control unit 18 generates PN generation enable signals ENa, ENb which show intervals where two kinds of PN codes PNa, PNb are generated, a PN code reset timing signal RE (hereafter, abbreviated as reset signal RE) which shows a PNcode generation start timing, and a PN clock signal PNCLK.

Figure 3:
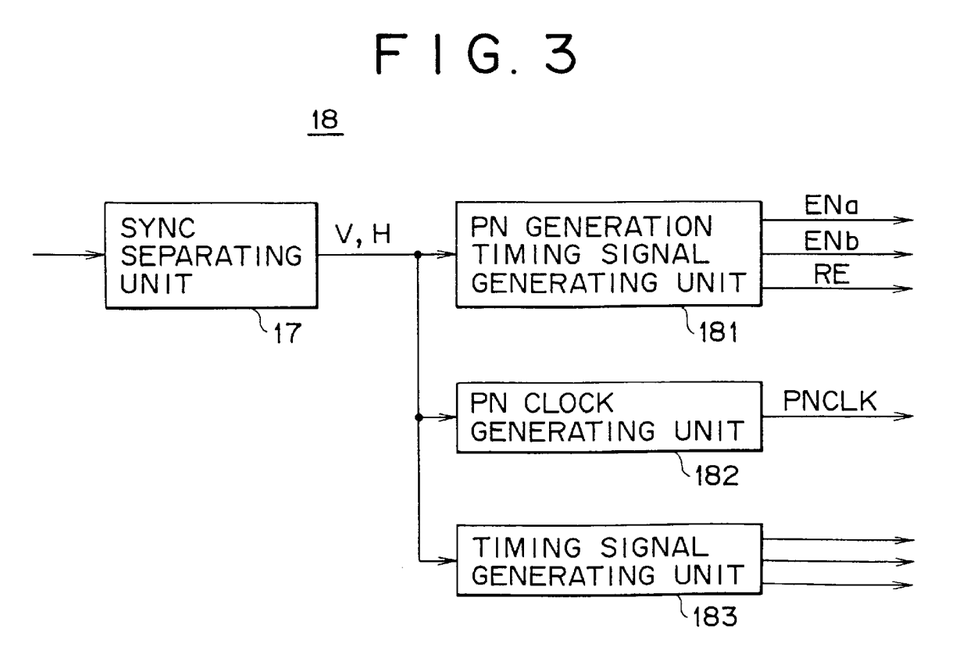
FIG. 3 shows an example of part of the construction of the device in FIG. 1.

FIG. 3 is a block diagram describing a specific example of the PN generation control unit 18. As shown in FIG. 3, the PN generation control unit 18 according to this embodiment comprises a PN generation timing signal generating unit 181, PN clock generating unit 182 which comprises a PLL, and a timing signal generating unit 183.

The horizontal sync signal H and vertical sync signal V from the sync separating unit 17 are supplied to the PN generation timing signal generating unit 181 and timing signal generating unit 183. The horizontal sync signal H from the sync separating unit 17 is supplied to the PN clock generating unit 182.

Figure 4A:
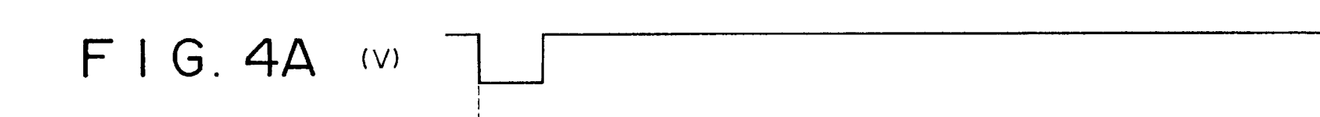
FIGS. 4A to 4I show a timing chart for describing one embodiment of the method of superimposing additional information according to this invention.
Figure 4B:
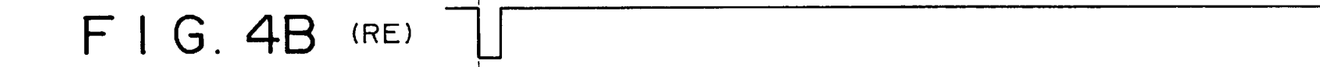

The PN generation timing signal generating unit 181 generates a reset signal RE, shown in FIG. 4B, of a vertical period which determines the repetition period of the PN code sequences used for spectral spreading, using the vertical sync signal V (FIG. 4A) as a reference.

In this example, the reset signal RE is a signal with a vertical period whose level drops at, for example, the leading edge of the vertical sync signal V.

Figure 4C:
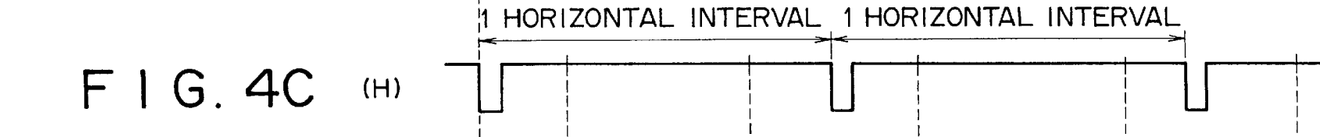

In this example, the PN generation timing signal generating unit 181 generates the PN generation enable signal ENa (FIG. 4D) and ENb (FIG. 4F) using the horizontal sync signal H (FIG. 4C).

Figure 4D:
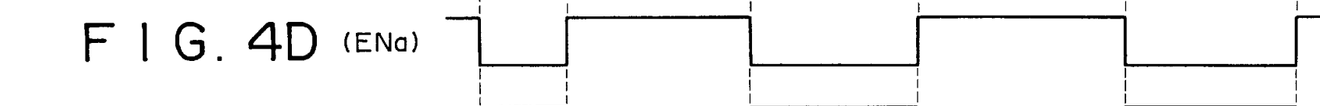

Also in this example, the PN generation enable signals ENa, ENb are low active signals, but the PN generation enable signal ENa is a signal which is low level at both ends in the horizontal direction, while the PN generation enable signal ENb is a signal which is low level at the center in a horizontal direction.

Using PLL, the PN clock generating unit 182 generates a PN clock PNCLK in synchronism with the horizontal sync signal H, and having a period of a block BL.

This PN clock PNCLK determines the chip period of the spreading code.

Figure 1:
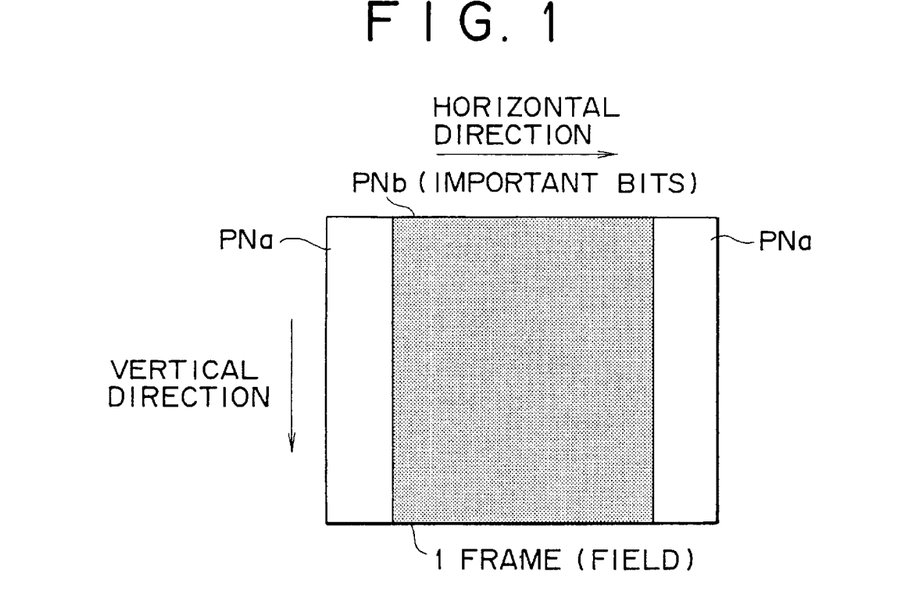
FIG. 1 is a block diagram of a device to which one embodiment of the additional information superimposing device according to this invention is applied.

The timing signal generating unit 183 generates various timing signals used in the device of FIG. 1 based on the vertical sync signal V and horizontal sync signal H.

The PN generation enable signals ENa, ENb, PN code reset signal RE and PN clock signal PNCLK, which are generated in the PN generation control unit 18, are supplied to the SS additional information generating unit 16.

Figure 5:
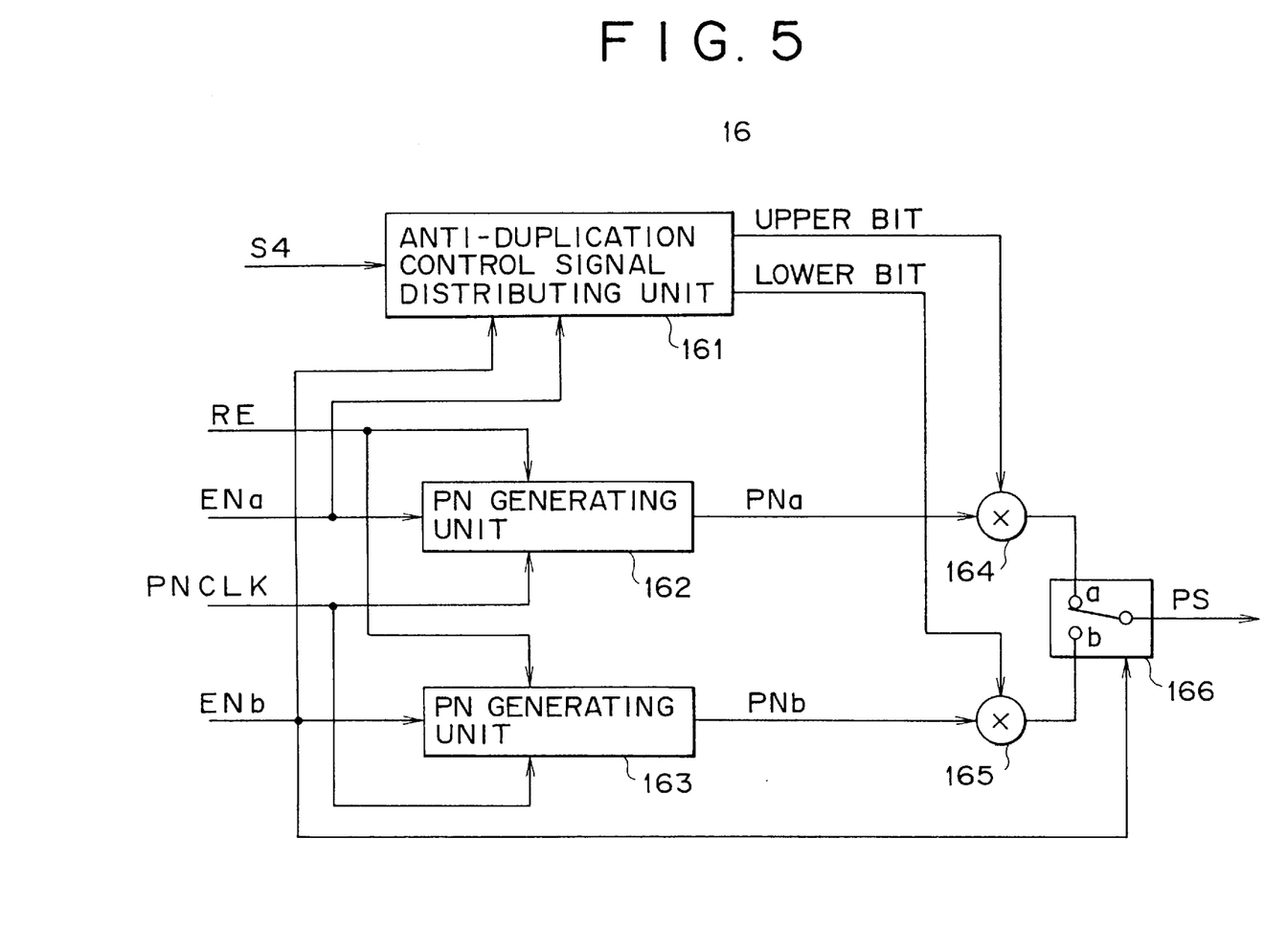
FIG. 5 is a figure showing an example of part of the construction of the device in FIG. 1.

FIG. 5 shows a specific example of the construction of the SS additional information generating unit 16, which comprises an anti-duplication control signal distributing unit 161, two PN generating units 162, 163, multipliers 164, 165 for spectral spreading, and a switching circuit 166.

The anti-duplication signal distributing unit 161 divides the two bits of information of CGMS into an upper bit and lower bit, supplies the upper bit to the multiplier 164 and supplies the lower bit to the multiplier 165 in synchronism with the generation timing of the PN codes PNa, PNb.

For this purpose, the enable signals ENa, ENb are supplied to the anti-duplication signal distributing unit 161. The anti-duplication signal distributing unit 161 supplies the upper bit to the multiplier 164 within the generation interval of the PN code sequence PNa, described hereafter, and supplies the lower bit to the multiplier 165 within the generation interval of the PN code sequence PNb, described hereafter (FIG. 4H).

The PN generating unit 162 generates the PN code sequence PNa according to the reset signal RE, PN clock PNCLK, and enable signal ENa supplied to it. The generated PN code sequence PNa is supplied to the multiplier 164.

The PN generating unit 163 generates the PN code sequence PNb according to the reset signal RE, PN clock PNCLK, and enable signal ENb supplied to it. The generated PN code sequence PNb is supplied to the multiplier 165.

That is, in this example, the PN generating units 162, 163 are reset in vertical period by the reset signal RE, and generate the PN codes PNa, PNb of different, predetermined sequences.

The PN code sequences PNa, PNb are generated by the PN generating units 162, 163 according to the clock signal PNCLK only in a PN code generation enable state due to the PN enable signals ENa, ENb.

In this example, as described hereabove, the PN generating units 162, 163 are permitted to generate the PN code sequences PNa, PNb when the enable signals ENa, ENb are low level. The PN code series PNa is generated in the start and end regions of a horizontal interval as shown in FIG. 4E, and the PN code series PNb is generated in the center region of a horizontal interval as shown in FIG. 4G.

Figure 4E:
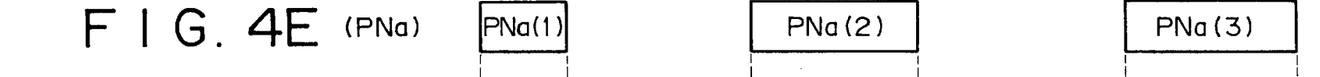
Figure 4F:
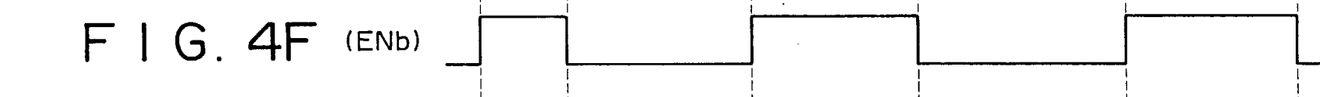
Figure 4G:
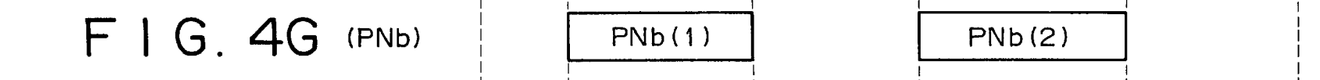
Figure 4H:
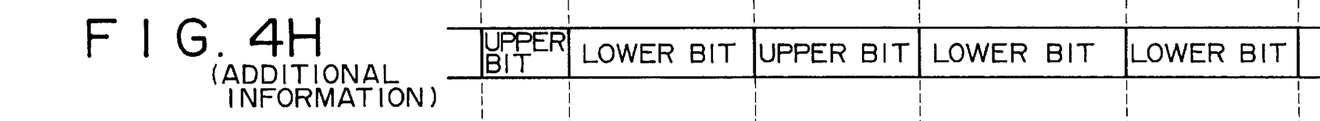
Figure 4I:
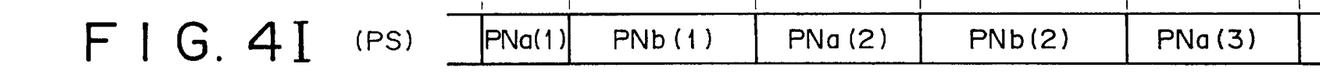

In this case, as the PN generating units 162, 163 are not reset in one vertical interval, different PN code sequences PNa(1), PNa(2) . . . and PNb(1), PNb(2) . . . are generated in the PN generation intervals as shown in FIG. 4E and FIG. 4G.

However, the PN generating units 162, 163 are reset by the reset signal RE at the beginning of a vertical interval, so the PN code series PNa, PNb are generated in each vertical interval.

Figure 6:
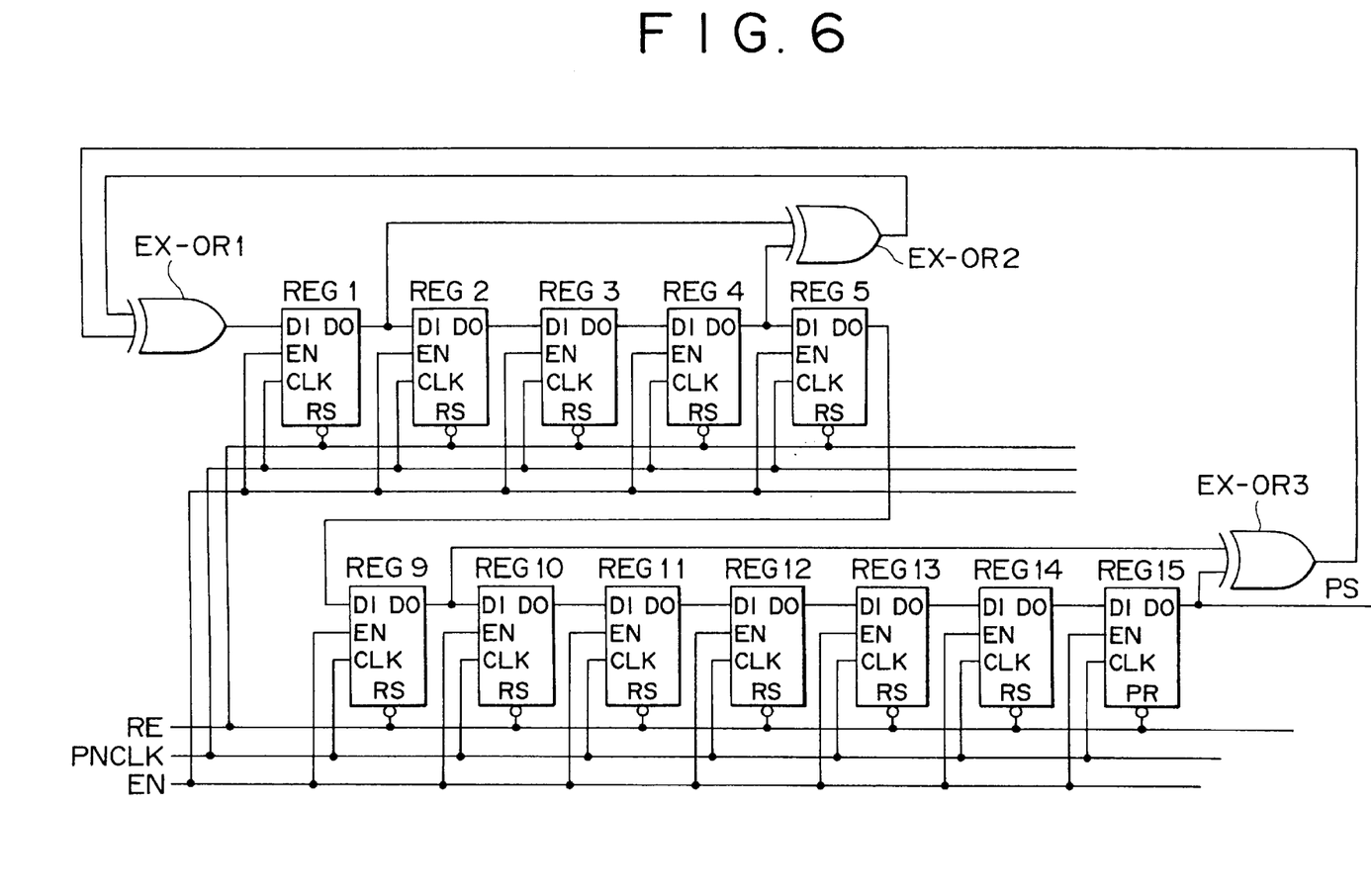
FIG. 6 is a figure showing an example of part of the construction of the device in FIG. 1.

FIG. 6 is a figure showing the construction of one of the two PN generating units 162, 163, e.g. the PN generating unit 162.

The PN generating unit 162 of this example comprises 15 D flip-flops REG1-REG15 which form a 15 stage shift register, and EXCLUSIVE OR circuits EX-OR1-EX-0R3 which compute a suitable tap output of this shift register.

The PN generating unit 162 shown in FIG. 5 generates PN codes PNa based on the enable signal ENa, PN clock signal PNCLK, and PN code reset timing signal RE as mentioned above.

The other PN generating unit 163 generates a PN code sequence PNb which is different from the PN code sequence PNa by, for example, supplying the input signals of the EXCLUSIVE OR circuits EX-OR1-EX-0R3 from D flip-flops which are different from those of FIG. 6.

The PN code sequence PNa generated by the PN generating unit 162 is supplied as described above to the multiplier 164. The upper bit of the anti-duplication control signal sent from the anti-duplication control signal distributing unit 161 in synchronism with the generation timing of this PN code sequence PNa, is spectrally spread by the PN code sequence PNa in this multiplier 164, as shown in FIG. 4H.

This spectrally spread signal is supplied to one input terminal a of the switching circuit 166.

Similarly, the PN code sequence PNb generated by the PN generating unit 163 is supplied to the multiplier 165. The lower bit of the anti-duplication control signal sent from the anti-duplication control signal distributing unit 161 in synchronism with the generation timing of this PN code sequence PNb, is spectrally spread by the PN code sequence PNb in this multiplier 165, as shown in FIG. 4H.

This spectrally spread signal is supplied to the other input terminal b of the switching circuit 166.

In this example, the switching circuit 166 is changed over by the enable signal ENb to the input terminal a in regions on the left and right edges of one horizontal interval, and changed over to the input terminal b in the center region of one horizontal interval.

As a result, in the regions of the left and right edges of the screen in each horizontal interval, a spectrally spread signal wherein the upper bit of CGMS is spread by the PN code sequence PNa is obtained on the left and right edges of the screen in each horizontal interval, and a spectrally spread signal wherein the lower bit of CGMS which is the important bit, is spread by the PN code sequence PNb, is obtained in the center region of the screen in each horizontal interval from the switching circuit 166.

In the superimposition level setting unit 19, a spectrally spread signal PS from this switching circuit 166 is a very low level signal depending on the values "0", "1" of the chips of the spectrally spread signal, and it is supplied to the superimposing unit 14.

Specifically, the superimposition level setting unit 19 performs D/A conversion whereby the spectrally spread signal which is a digital signal is converted to an analog signal.

In this case of the example the superimposition level setting unit 19 outputs an analog level according to the chip value of the spectrally spread anti-duplication control signal to the superimposing unit 14, i.e. a positive very low level when the chip value of the SS anti-duplication control signal is "0", and a negative very low level when the chip value of the SS anti-duplication control signal is "1".

The superimposing unit 14 superimposes the analog SS anti-duplication control signal mentioned above on the analog video signal S3 so as to form an output video signal Vi which is output.

Hence, the superimposing unit 14 has the function of a superimposing means which superimposes the SS anti-duplication control signal, an anti-duplication control signal spectrally spread by the PN code sequence PS, on the analog video signal S3.

Figure 7A:
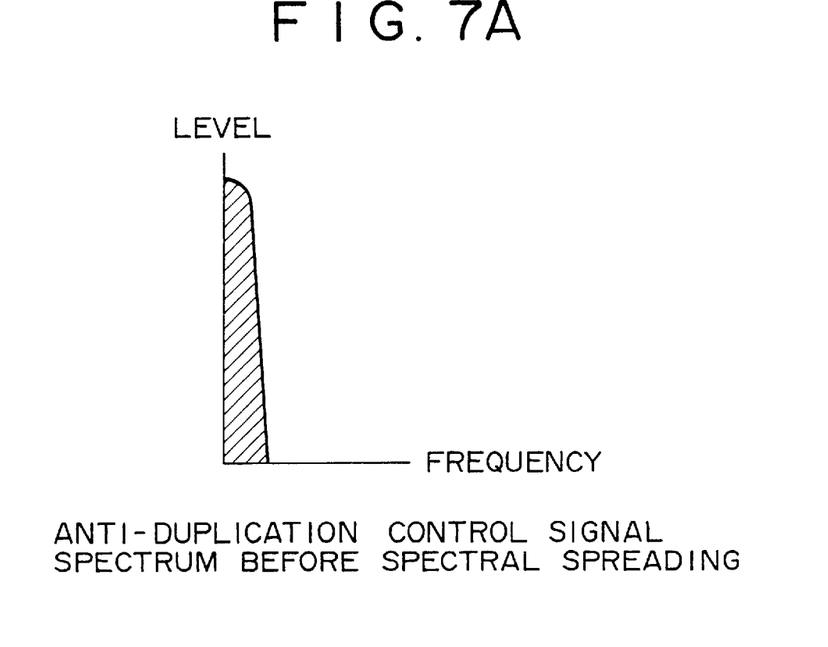
FIGS. 7A to 7D show the relation between an information signal and a superimposing level of a spectrally spread signal.
Figure 7B:
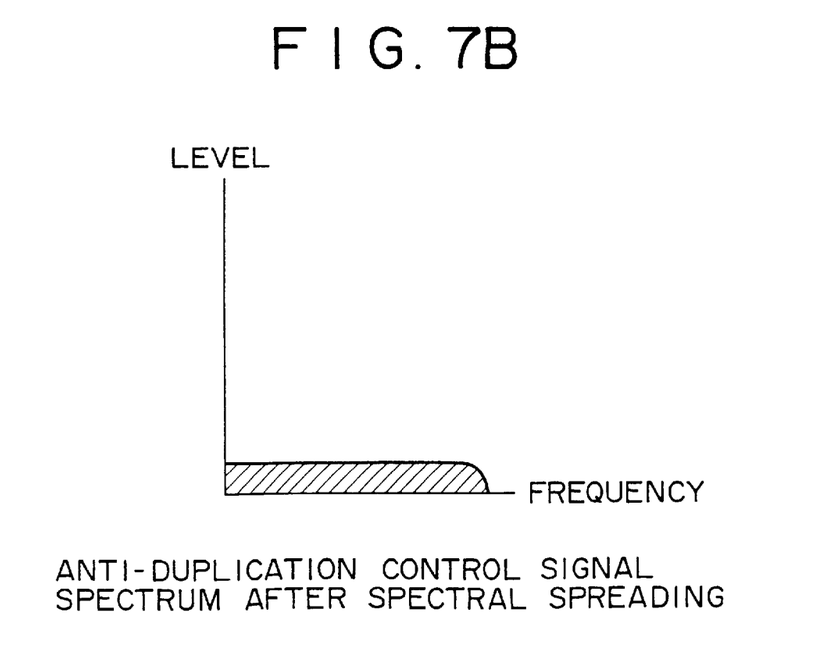

FIGS. 7A and 7B show the relation between the anti-duplication control signal and the video signal as a spectrum.

The anti-duplication control signal is a low bit rate signal containing only a small amount of information, and it is a narrow-band signal as shown in FIG. 7A.

When this is spectrally spread, it becomes a wideband signal as shown in FIG. 7B.

The spectrally spread signal level decreases in inverse proportion to the bandwidth spreading ratio.

Figure 7C:
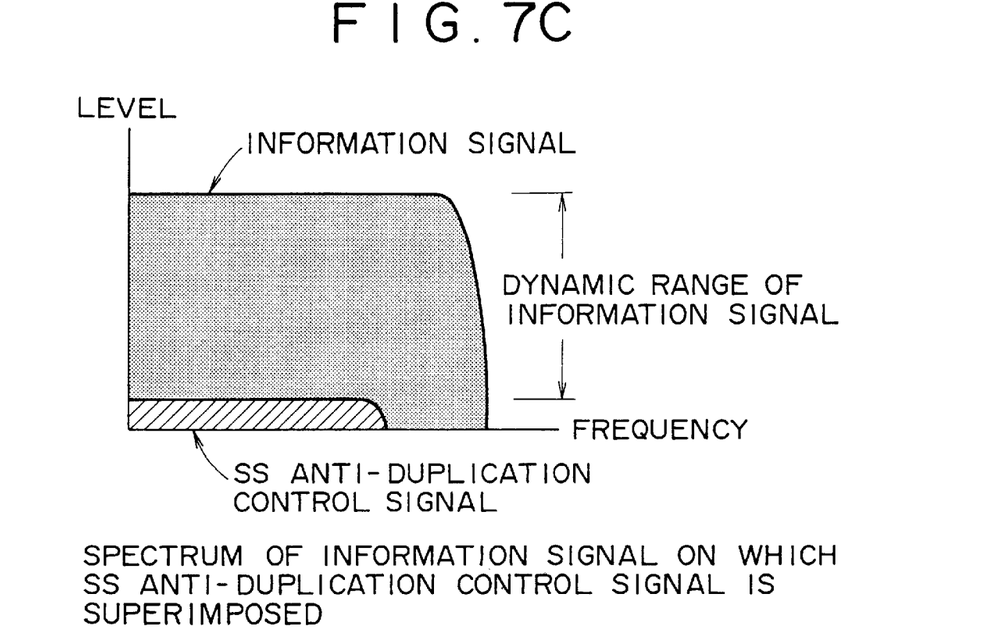

This spectrally spread signal, i.e. the SS anti-duplication signal, is superimposed on the information signal by the superimposing unit 14, and in this process, the SS anti-duplication signal is superimposed at a smaller level than the dynamic range of the video signal which is the information signal, as shown in FIG. 7C.

Hence, deterioration of the main information signal due to this superimposition can be almost completely prevented.

Therefore, when the video signal on which the SS anti-duplication control signal is superimposed, is supplied to a monitor and the video signal is reproduced, the SS anti-duplication control signal has almost no effect, and a good reproduced image is obtained.

Figure 7D:
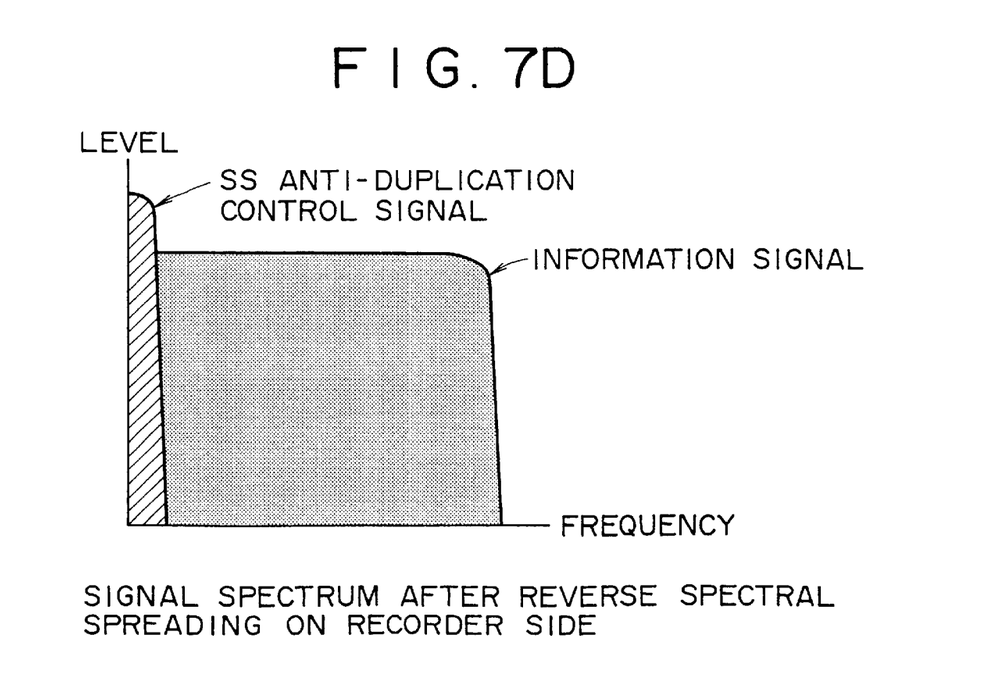

On the other hand, when reverse spectral spreading is performed to detect the SS anti-duplication control signal on the recording side, as described hereafter, the SS anti-duplication control signal is restored as a narrow-band signal as shown in FIG. 7D.

By providing a sufficient bandwidth spreading factor, the power of the anti-duplication signal after reverse spreading exceeds the power of the information signal, so it can be detected.

As the SS anti-duplication control signal superimposed on the analog video signal has the same timing and frequency as the analog video signal, deletion or modification is impossible by frequency filtering or simple substituting of information.

Hence, the SS anti-duplication control signal which is superimposed on the video signal cannot be removed, and is therefore supplied to monitors and recorders without fail.

It is therefore difficult to tamper with or remove the anti-duplication signal, so this anti-duplication control definitively prevents illegal duplication.

Moreover, according to the above construction, spectral spreading was performed using a PN code sequence having a vertical period based on the vertical sync signal. Hence, the PN code sequence for reverse spectral spreading required to detect this spectrally spread signal from the video signal can easily be generated based on a signal synchronized with the vertical sync signal detected from the video signal.

That is, it is unnecessary to perform synchronization control of the PN code for reverse spreading, for example, by a sliding correlation device.

Moreover, the anti-duplication control is performed more effectively by having superimposed important bits in the center region in the horizontal direction of the screen which is not much affected by tampering with the video signal.

The analog output video signal on which the SS anti-duplication control information is superimposed, is then supplied to a monitor which displays the image on a recorder 14 described hereafter.

Next, the recorder which receives the analog video signal from the aforesaid DVD player and records it will be described.

Figure 8:
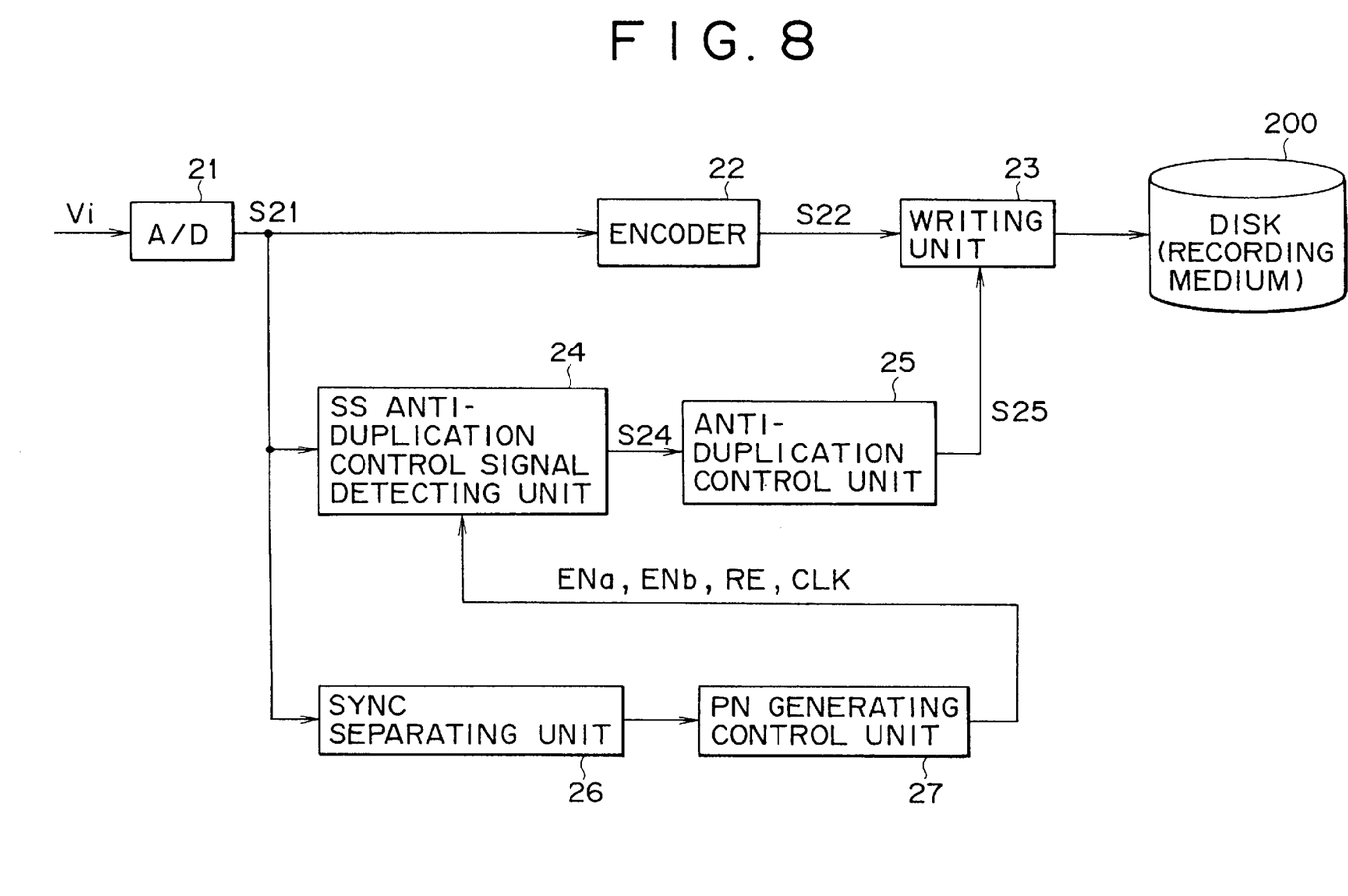
FIG. 8 is a figure showing an example of a device provided with a detecting unit for detecting additional information superimposed by the superimposing method of this invention.

FIG. 8 is a figure which describes the video signal recorder (referred to hereafter simply as "recorder") used in this system.

As shown in FIG. 8, the recorder comprises an A/D conversion circuit 21, encoder 22, write unit 23, detecting unit 24 (referred to hereafter as SS anti-duplication control signal detecting unit) for detecting the anti-duplication signal which has been spectrally spread and superimposed on the video signal, duplication control unit 25 which permits or prohibits duplication, sync separating unit 26, and PN generation control unit 27.

A recording medium 200 is a DVD on which the video signal is written by this recorder.

The analog video signal Vi supplied by the player is converted by the A/D conversion circuit 21 into a digital video signal S21, and supplied to the encoding unit 22, SS anti-duplication control signal detecting unit 24, and sync separating unit 26.

The encoding unit 22 receives the digital video signal S21, removes the image sync signal, and performs processing on the digital video signal such as data compression to form a digital video signal S22 for recording on the recording medium 200 which is supplied to the write unit 23.

The sync separating unit 26 extracts the horizontal sync signal H and vertical sync signal V from the digital video signal S21 prior to encoding, and supplies the result to the PN generation control unit 27.

The PN generation control unit 27 of the recorder has the same construction as the PN generation control unit 18 of the player which was described referring to FIG. 3.

Herein, therefore, the PN_generation control unit 27 will be described assuming that it has the same construction as that shown in FIG. 3.

The PN generation timing signal generating unit 181 of the PN generation control unit 27 generates the PN code reset timing signal RE (referred to hereafter simply as reset signal RE) which provides the reset timing of the PN code sequences PNa, PNb for reverse spectral spreading corresponding to the player described above by using the vertical sync signal V as a reference signal, and generates enable signals ENa, ENb corresponding to the enable signal in the player by using the horizontal sync signal H as a reference signal.

The reset signal RE generated here is the same signal as the PN code reset timing signal RE generated in the PN generation control unit 18 of the player, described above. It provides a timing corresponding to a start position in a vertical interval of the video signal.

The PN clock generating unit 182 of the PN generation control unit 27 generates a PN clock signal PNCLK which synchronizes with the horizontal sync signal H. This clock signal PNCLK is a signal corresponding to the clock signal PNCLK used in the player described hereabove.

Moreover, the timing signal generating unit 183 of the PN generation control unit 27 generates various timing signals based on the horizontal sync signal H.

The reset signal RE, enable signals ENa, ENb, and clock signal PNCLK generated in the PN generation control unit 27 are supplied to the PN generating unit 28.

The enable signals ENa, ENb and clock signal PNCLK from the PN generation control unit 27 are supplied to the SS anti-duplication control signal detecting unit 24.

Figure 9:
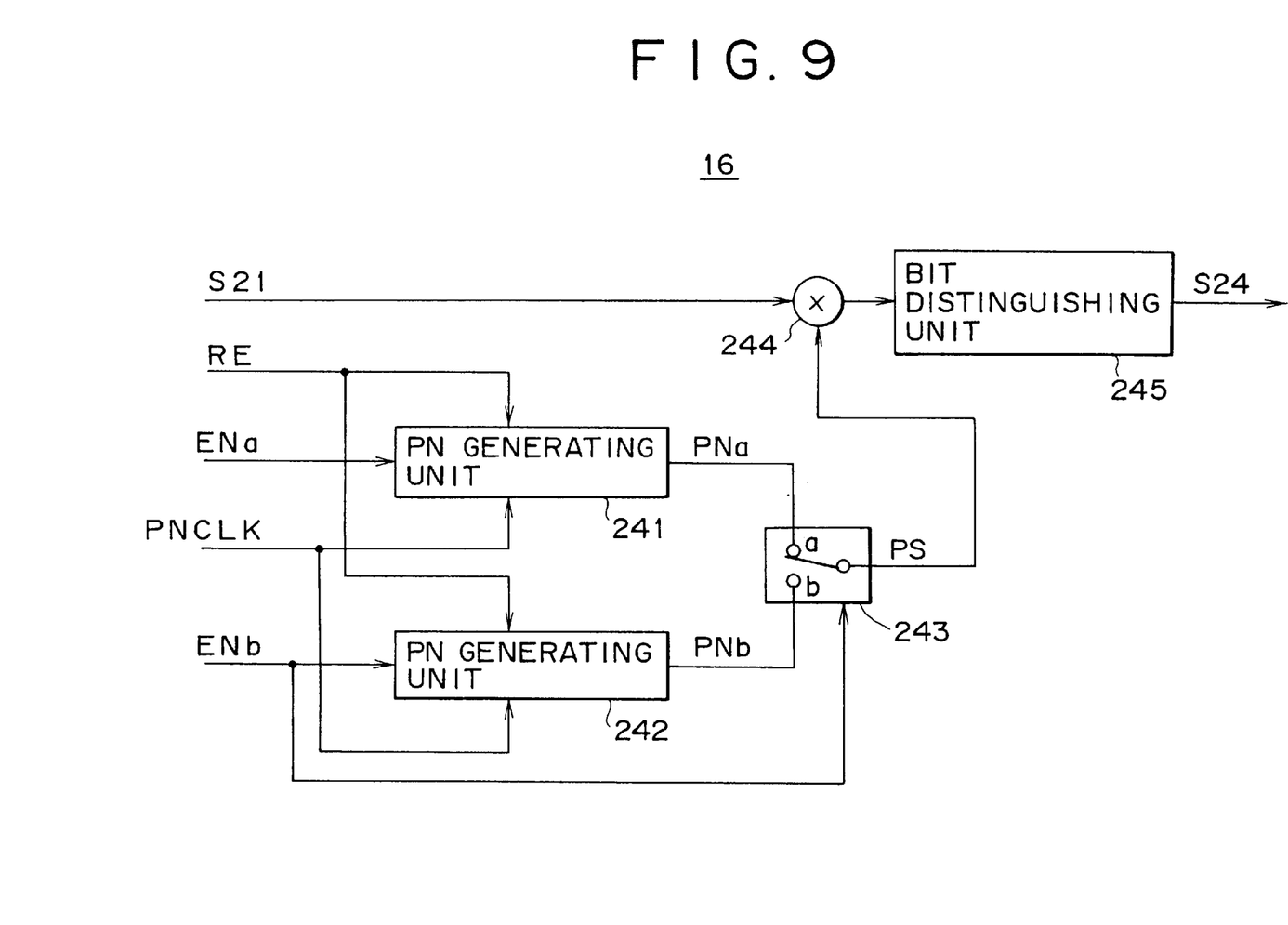
FIG. 9 is a figure showing an example of part of the construction of the device in FIG. 8.

This SS anti-duplication control signal detecting unit 24 has the construction shown in FIG. 9.

Specifically, the SS anti-duplication control signal detecting unit 24 has an identical construction respectively to the two PN generating units 162, 163 in the SS additional information generating unit 16 of the player. It comprises two PN generating units 241, 242 which respectively generate identical PNcode sequences PNa, PNb, a switching circuit 243, a reverse spreading multiplier 244, and a bit distinguishing unit 245.

As in the above-mentioned case, the reset signal RE from the PN generation control unit 27, PN clock signal PNCLK, and enable signals ENa, ENb are supplied to the PN generating units 241, 242 as shown in the figure.

As a result, PN code sequences PNa, PNb synchronized with the PN code sequences used for spreading which were generated in the SS additional information generating unit 16, are respectively generated by the PN generating units 241, 242, and are supplied via the switching circuit 243 to the multiplier 244.

The switching circuit 243 is changed over by, for example, the enable signal ENb respectively to an input terminal a (PNa side) in regions on the left and right edges of the screen in each horizontal interval, and an input terminal b (PNb side) in the center region of the screen in each horizontal interval?

As a result, a PN code sequence which is exactly synchronized with the PN code sequence used in the SS additional information generating unit 16 is supplied by the switching circuit 243 to the multiplier 244.

In the multiplier 244, reverse spectral spreading is performed, and both bits of the anti-duplication control signal are restored.

The output signal from this multiplier 244 is supplied to the bit distinguishing unit 245. The two bit anti-duplication control signal S24 of CGMS is thereby distinguished from the two bits of additional information dispersed between the left and right edges and the center region in a horizontal direction.

The anti-duplication control signal S24 thus obtained is supplied to the anti-duplication unit 25.

The anti-duplication unit 25 decodes the anti-duplication control signal S24, and determines whether duplication of the video signal supplied to the recorder is permitted or prohibited.

Based on the distinction result, a write control signal S25 is generated and supplied to the write unit 23 so as to either permit or prohibit writing of the video signal S22.

When the write control signal S25 permits writing, the write unit 23 writes the video signal S22 on the recording medium 200, and when the write control signal S25 prohibits writing, the write unit 23 does not write the video signal S22 on the recording medium 200.

Hence, the recording device of this embodiment extracts the anti-duplication control signal superposed on the image signal by performing reverse spectral spreading on the video signal whereon the SS anti-duplication control signal has been superimposed, using the same code sequence as the PN code sequence PS used for spectral spreading.

In this case, two bits of additional information are dispersed according to the priority of the bits, and the bit with higher priority is superimposed in a position (in the above example, in the center in a horizontal direction) which is unaffectedly tampering with the video signal. Therefore, even if tampering with the video signal occurs, the important bit is not lost.

The synchronization of the PN code may shift relative to the vertical sync signal of the video signal, so sync control of the PN code for reverse spreading is required, but as this synchronous control need only be one horizontal interval at most, the important bits can be detected without fail.

Moreover in the above embodiment, as different PN code sequences were used for each information bit, the superimposing position on the video signal is determined for each bit, and so each bit can be detected.

According to the aforesaid first embodiment, although plural bits of additional information were dispersed, important bits were grouped in the center of the horizontal direction of the screen, but there is no need to group the important bits in this way.

According to this second embodiment, plural bits of additional information are dispersed evenly.

Figure 10:
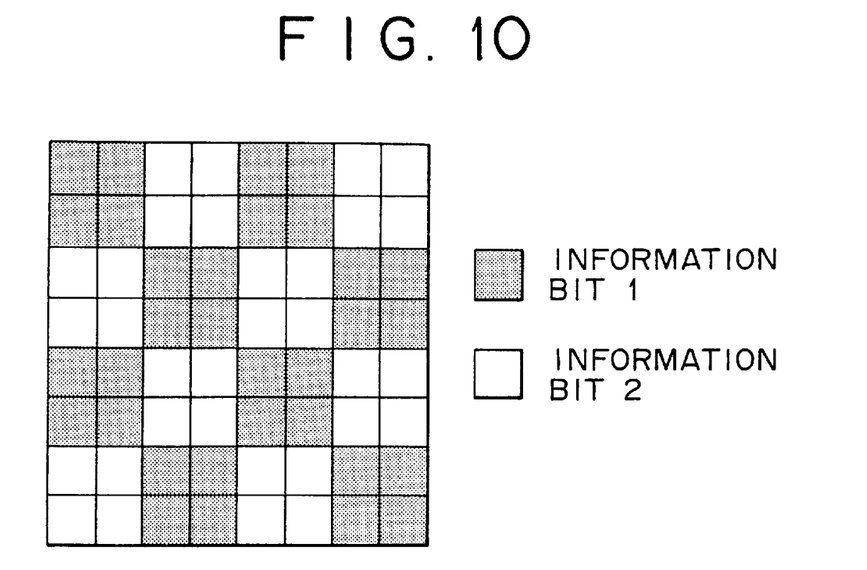
FIG. 10 is a diagram for describing an additional information superimposing pattern in another embodiment of the additional information superimposing method according to this invention.

FIG. 10 shows the case wherein plural bits of additional information are superimposed according to the second embodiment. In this case also, when the two bits of additional information of CGMS are superimposed on the video signal, the area of one screen is divided into plural squares, and upper and lower information bits are superimposed alternately in these squares so as to form a checkered pattern. In the figure, a spectrally spread signal comprising lower bits which are spectrally spread is superimposed in the squares with grid points?

In this second embodiment also, the upper and lower bits are respectively spectrally spread using different PN code sequences, for example the aforesaid PN code sequences PNa, PNb, to obtain a superimposed SS additional information signal in the same way as the aforesaid first embodiment. The SS anti-duplication control signal superimposed on the video signal is generated in essentially the same way as that of the first embodiment by generating enable signals ENa, ENb based on the vertical sync signal V and horizontal sync signal H which are supplied to the PN generator that generates the PN code sequences PNa, PNb respectively, so as to obtain the pattern in FIG. 10.

As only one spectrally spread signal is superimposed on each of the square dispersion areas, it is easy to superimpose the signal at a very low level which does not affect the reproduced image from the video signal even if there are plural bits of additional information.

The information bits are widely dispersed over the screen, so even if the screen information is modified by tampering which would cause loss of part of the information, the information bits remain and the additional information can be extracted without fail.

Also, it is possible to reverse spread and detect for example only the important bits by generating a spreading code for the important bits according to the dispersion pattern of these bits.

Figure 11:
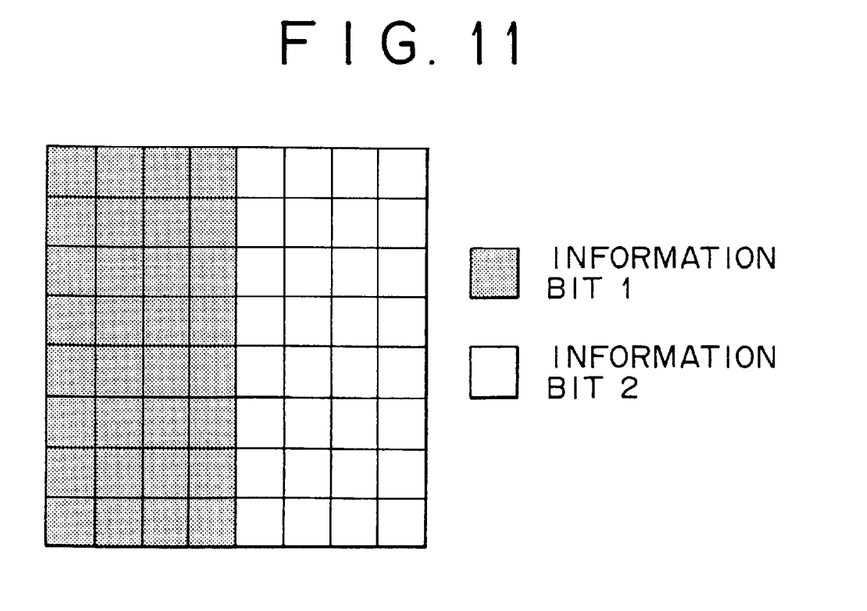
FIG. 11 is a diagram for describing an additional information superimposing pattern in another embodiment of the additional information superimposing method according to this invention.

FIG. 11 relates to the superimposing position of plural bits according to the third embodiment. According to the third embodiment, when the aforesaid two bits of CGMS additional information are superimposed on the video signal, one screen is divided into two parts in a horizontal direction as shown in FIG. 11, and the upper bit is assigned to the right half and the lower bit to the left half as shown by the grid points.

In this third embodiment, the upper bit and lower bit are spectrally spread by, for example, the aforesaid PN code sequences PNa, PNb respectively, so as to obtain the superimposing SS additional information signal as in the case of the aforesaid first embodiment.

The SS anti-duplication control signal superimposed on the video signal is generated in essentially the same way as that of the first embodiment by generating enable signals ENa, ENb based on the vertical sync signal V and horizontal sync signal H which are supplied to the PN generator that generates the PN code sequences PNa, PNb respectively, so that the first and second halves in a horizontal direction are low level.

In this third embodiment, as only one spectrally spread signal is superimposed on each of the left and right halves of the screen, it is easy to superimpose the signal at a very low level which does not affect the reproduced image from the video signal even if there are plural bits of additional information.

According to this third embodiment, only the important bits can be detected by generating a bit spreading code corresponding to the area on the left where the important bits are situated, and performing reverse spreading on these bits.

According to the above embodiment, one screen was divided, one bit of the plural bits of additional information was assigned to each of the resulting areas, and superimposed on the video signal. However, the reset period of the spectral spreading code may be plural vertical periods instead of one vertical period, and the plural bits of additional information dispersed and distributed in a spatial direction.

For example, important information bits can be assigned to each field of the video signal, to every other field, or to one field in plural fields.

In this case, a reset signal RE in plural field units is needed, but this reset signal RE can easily be generated by superimposing a time code or the like on the video signal.

One bit of information can of course be superimposed not in one field, but over plural fields.

The reset period of the spreading code may be one horizontal period or plural horizontal periods. In this case, the plural bits of additional information are dispersed in units of one horizontal period or plural horizontal periods, and their superimposing position is determined according to priority.

Moreover, the invention may also take the form of a combination of the aforesaid first and second embodiments.

That is, each of the plural bits of additional information are superimposed at dispersed positions of the video signal, and important information is superimposed at a position which would be unaffected by tampering with the video signal.

In the aforesaid embodiment, the superimposition level was set to either positive or negative according to "0" or "1" of the chip of the spreading code, but one level may be 0 level and the other either positive or negative.

Moreover, in the aforesaid description, the additional information signal which was spectrally spread and superimposed on the video signal was an anti-duplication control signal, however the additional information is not limited to an anti-duplication control signal, and may also be, for example, information related to the digital video signal, or for example a time code for identifying each field or copyright information, etc.

As copyright information, a serial number specifying the recording device may for example be used.

If this serial number is superimposed and recorded on the digital video signal Vi, it is easy to track the copying history.

It will moreover be understood that the additional information is not limited to two bits, but may also be three or more bits.

In the aforesaid description, the spectrally spread signal was superimposed on an analog video signal, but it may of course be superimposed on a digital video signal in which case this invention can still be applied.

Moreover, it is possible to superimpose the spectrally spread signal on the video signal by specifying that, when the value of the additional information bit is, for example, "1", the PN code of the sequence corresponding to this bit is superimpose, and when the additional information bit is "0", it is not superimposed.

Moreover, in the above description, additional information bits were spectrally spread by using different PN code sequences for each bit, however a common spreading code may also be used for all bits.

Further, the spreading code is not limited to a PN code, but may also be another code such as a gold code.

Moreover, this invention may be applied also to the case where, instead of spectrally spreading and superimposing additional information, a signal corresponding to each bit is superimposed on the video signal at a very low level which does not affect the reproduced image.

Moreover, in the aforesaid description, the invention was applied to a recording and playback system, but it may be applied also to the case where additional information is superimposed on the video signal and transmitted by various media, for example, radio waves, cables or infrared waves.

What is claimed:

1. A method of superimposing an additional information signal formed of plural bits on a video signal, comprising the steps of:
generating spreading code sequences corresponding to different predetermined parts of a video signal in synchronism with a sync signal of said video signal,
spectrally spreading bit information signals of said additional information signal comprising plural bits by using said spreading code sequences to generate spectrally spread bit information signal corresponding to said plural bits of said additional information signal, and
superimposing said spectrally spread bit information signals on said corresponding different predetermined part of said video signal.

2. The method of superimposing an additional information signal formed of plural bits on a video signal as claimed in claim 1, further comprising the step of assigning different priorities to said plural bits of said additional information signal, wherein said spectrally spread bit information signals corresponding to high priority ones of said plural bits are superimposed on high priority parts of said video signal.

3. The method of superimposing an additional information signal formed of plural bits on a video signal as claimed in claim 2, further comprising the step of superimposing said spectrally spread bit information signals corresponding to high priority bits of plural bits of said additional information signal on a part of said video signal equivalent to an image center of said video signal.

4. The method of superimposing an additional information signal formed of plural bits on a video signal as claimed in claim 1, further comprising the steps of assigning different priorities to said plural bits of said additional information signal, wherein said spectrally spread bit information signals corresponding to high priority bits of plural bits of said additional information signal are superimposed on separate parts of one image of said video signal.

5. The method of superimposing an additional information signal formed of plural bits on a video signal as claimed in claim 1, wherein step of generating said spreading code sequences in correspondence with different predetermined parts of said video signal includes the step of generating different spreading code sequences.

6. The method of superimposing an additional information signal formed of plural bits on a video signal as claimed in claim 1, comprising the further steps of forming said additional information signal as an anti-duplication control signal and controlling duplication of said video signal on a recording medium using said anti-duplication control signal.

7. A device for superimposing an additional information signal formed of plural bits on a video signal, comprising:
means for generating spreading code sequences corresponding to different predetermined parts of a video signal in synchronism with a sync signal of said video signal;
means for spectrally spreading bit information signals of said additional information signal formed of plural bits by said spreading code sequences to generate spectrally spread bit information signals corresponding to said plural bits; and
means for superimposing said spectrally spread bit information signals on said corresponding different predetermined parts of said video signal.

8. The device for superimposing an additional information signal formed of plural bits on a video signal as claimed in claim 7, wherein said plural bits of said additional information signal have different priorities, and said spectrally spread signal generating means includes means for using said spreading code sequences which are generated by assigning relatively high priority bits of said plural bits to corresponding relatively high priority parts of different predetermined parts of said video signal.

9. The device for superimposing an additional information signal formed of plural bits on a video signal as claimed in claim 8, wherein said relatively high priority parts of different predetermined parts of said video signal are parts of said video signal equivalent to an image center of said video signal.

10. The device for superimposing an additional information signal formed of plural bits on a video signal as claimed in claim 7, wherein said plural bits of said additional information signal have different priorities, and said spectrally spread signal generating means includes means for using said spreading code sequences which are generated by assigning relatively high priority bits of said plural bits to separate parts of one image of said video signal.

11. The device for superimposing an additional information signal formed of plurality bits on a video signal as claimed in claim 7, wherein said spreading code sequence generating means generates spreading codes comprising different spreading code sequences corresponding to different predetermined parts of said video signal.

12. The device for superimposing an additional information signal formed of plural bits on a video signal as claimed in claim 7, wherein said additional information signal is an anti-duplication control signal for controlling duplication of said video signal on a recording medium.

* * * * *